United States Patent
Washiro

(10) Patent No.: US 9,431,847 B2
(45) Date of Patent: Aug. 30, 2016

(54) COMMUNICATION DEVICE, COMMUNICATION METHOD, BATTERY DEVICE, AND ELECTRONIC APPARATUS

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 13/984,073

(22) PCT Filed: Feb. 14, 2012

(86) PCT No.: PCT/JP2012/053438
§ 371 (c)(1),
(2), (4) Date: Aug. 7, 2013

(87) PCT Pub. No.: WO2012/114949
PCT Pub. Date: Aug. 30, 2012

(65) Prior Publication Data
US 2013/0307484 A1    Nov. 21, 2013

(30) Foreign Application Priority Data

Feb. 23, 2011 (JP) ................................. 2011-037394

(51) Int. Cl.
*H02J 7/00* (2006.01)
*H02J 7/02* (2016.01)
*H01M 10/42* (2006.01)

(52) U.S. Cl.
CPC ............. *H02J 7/02* (2013.01); *H02J 7/0016* (2013.01); *H01M 10/425* (2013.01); *Y02T 10/7055* (2013.01)

(58) Field of Classification Search
CPC ..... H02J 7/02; H02J 7/0016; Y02T 10/7055; H01M 10/425
See application file for complete search history.

(56) References Cited

U.S. PATENT DOCUMENTS

| | | | |
|---|---|---|---|
| 2009/0058190 A1* | 3/2009 | Tanaka | G06K 19/0701 307/104 |
| 2010/0079146 A1* | 4/2010 | Kurose et al. | 324/433 |
| 2011/0260550 A1* | 10/2011 | Jung et al. | 307/104 |

FOREIGN PATENT DOCUMENTS

| | | |
|---|---|---|
| JP | 3289320 | 3/2002 |
| JP | 2009-016131 | 1/2009 |
| JP | 2009-272769 | 11/2009 |

OTHER PUBLICATIONS

"Turn Ratio", VoltechNotes, @2001.*

* cited by examiner

*Primary Examiner* — Nha Nguyen
(74) *Attorney, Agent, or Firm* — Chip Law Group

(57) ABSTRACT

The present technique relates to a communication device, a communication method, a battery device, and an electronic apparatus that can easily manage a battery device formed with a large number of battery cells. A transformer (171) is formed with a coil (181) on the side of a battery (51) and a coil (182) on the side of an IC chip (53). The number of turns in the coil (181) is small while the number of turns in the coil (182) is large. In a battery cell (31-3), the number of turns in the coil (181) of the transformer (171) is small (the resistance is low), and loss in an AC signal can be reduced accordingly. A voltage generating unit (151) having the large number of turns in the coil (182) can generate a high voltage, and supply the high voltage to the IC chip (53). The present invention can be applied to an electronic apparatus that includes a large number of battery cells, for example.

9 Claims, 7 Drawing Sheets

COMMUNICATION DEVICE, COMMUNICATION METHOD, BATTERY DEVICE, AND ELECTRONIC APPARATUS

TECHNICAL FIELD

This disclosure relates to communication devices, communication methods, battery devices, and electronic apparatuses, and more particularly, to a communication device that is designed to communicate information via power lines, a communication method, a battery device, and an electronic apparatus.

BACKGROUND ART

In recent years, battery devices are used in various products. When the amount of power to be used is large, the battery capacity also needs to be large. As the capacities of such battery devices are becoming larger, security and reliability are expected to be ensured.

As the capacities of battery devices become larger, the number of battery cells in each of the battery devices also becomes larger, and the price of each battery device becomes higher. Therefore, there is a possibility that a user takes apart a battery device, and replaces the internal battery cells with less expensive ones without authorization.

The applicant has previously suggested that IC chips should be provided in a battery device, and an identification number should be stored in each of the IC chips (Patent Document 1, for example). With this structure, the identification numbers are read from the battery device, and authenticating operations are performed based on the read identification numbers. In this manner, unauthorized battery devices can be spotted, and then be eliminated.

CITATION LIST

Patent Document

Patent Document 1: Japanese Patent Publication No. 3289320

SUMMARY OF THE INVENTION

Problems to be Solved by the Invention

In the previously suggested battery device, an information terminal is provided independently of the terminal for supplying power, and identification information is read from the information terminal.

As a result, the same number of information terminals as the number of battery cells need to be provided to read the identification information from the respective IC chips provided in the battery cells housed in the battery device. In the case of an electric vehicle, for example, 100 or more battery cells need to be connected in series, and therefore, securing communication lines becomes difficult. Also, the battery device becomes larger in size, and the costs become higher. As a result, it becomes difficult to realize a battery device that can be easily managed.

This disclosure is being made in view of the above circumstances, and the object thereof is to easily manage a battery device formed with a large number of battery cells.

Solutions to Problems

A communication device as a first aspect of this disclosure includes: a storage element that outputs stored information via a power line by performing load modulation on an AC signal transmitted/received via the power line; and a voltage generating unit that supplies voltage generated from the AC signal transmitted/received via the power line to the storage element, the voltage generating unit being connected in parallel to the storage element and including a transformer having a first coil on the side of the storage element and a second coil on the side of the power line, the self-inductance $L_1$ of the first coil being higher than the self-inductance $L_2$ of the second coil.

The communication device as the first aspect of this disclosure may further include an input blocking unit that blocks power flowing through the power line from being input to the storage element.

The communication device as the first aspect of this disclosure may further include a first capacitor that forms a series resonance circuit for the frequency of the AC signal with the second coil.

The first capacitor may also serve as the input blocking unit.

The communication device as the first aspect of this disclosure may further include a second capacitor that forms a parallel resonance circuit for the frequency of the AC signal with the first coil.

The second capacitor may be provided in the storage element.

A communication method as the first aspect of this disclosure is a communication method for a communication device that includes: a storage element; and a voltage generating unit that is connected in parallel to the storage element and includes a transformer having a first coil on the side of the storage element and a second coil on the side of a power line, the self-inductance $L_1$ of the first coil being higher than the self-inductance $L_2$ of the second coil. The communication method includes: outputting stored information via the power line by performing load modulation on an AC signal transmitted/received via the power line, the outputting being performed by the storage element; and supplying voltage generated from the AC signal transmitted/received via the power line to the storage element, the supplying being performed by the voltage generating unit.

In the first aspect of this disclosure, the storage element performs load modulation on the AC signal transmitted/received via the power line, and outputs stored information via the power line. Also, the voltage generating unit supplies the voltage generated from the AC signal transmitted/received via the power line, to the storage element.

A battery device as a second aspect of this disclosure includes: a battery that outputs DC power via a power line; a storage element that outputs stored battery information via the power line by performing load modulation on an AC signal transmitted/received via the power line; and a voltage generating unit that supplies voltage generated from the AC signal transmitted/received via the power line to the storage element, the voltage generating unit being connected in parallel to the storage element and including a transformer having a first coil on the side of the storage element and a second coil on the side of the power line, the self-inductance $L_1$ of the first coil being higher than the self-inductance $L_2$ of the second coil.

Battery cells each including the battery, the storage element, and the voltage generating unit may be connected in series to form the battery device.

In the second aspect of this disclosure, the battery outputs DC power via the power line, and the storage element performs load modulation on the AC signal transmitted/received via the power line, to output stored information via the power line. Also, the voltage generating unit supplies the voltage generated from the AC signal transmitted/received via the power line, to the storage element.

An electronic apparatus as a third aspect of this disclosure includes: a battery device that includes: a battery that outputs DC power via a power line; a storage element that outputs stored battery information via the power line by performing load modulation on an AC signal transmitted/received via the power line; and a voltage generating unit that supplies voltage generated from the AC signal transmitted/received via the power line to the storage element, the voltage generating unit being connected in parallel to the storage element and including a transformer having a first coil on the side of the storage element and a second coil on the side of the power line, the self-inductance L1 of the first coil being higher than the self-inductance L2 of the second coil; an operating unit that performs a predetermined operation by using the power supplied from the battery device; and a management device that acquires the battery information by communicating the AC signal to the storage element via the power line, and controls the power supply from the battery device to the operating unit based on the acquired battery information.

In the third aspect of this disclosure, the battery outputs DC power via the power line, and the storage element performs load modulation on the AC signal transmitted/received via the power line, to output stored information via the power line. Also, the voltage generating unit supplies the voltage generated from the AC signal transmitted/received via the power line, to the storage element. Further, the management device acquires the battery information by communicating the AC signal to the storage element via the power line, and controls the power supply from the battery device to the operating unit based on the acquired battery information.

Effects of the Invention

According to the first aspect of this disclosure, an electronic apparatus that is easily managed can be realized.

According to the second aspect of this disclosure, a battery device that is easily managed can be realized.

According to the third aspect of this disclosure, an electronic apparatus that easily manages a battery device formed with a large number of battery cells can be realized.

MODES FOR CARRYING OUT THE INVENTION

The following is a description of modes (hereinafter referred to as embodiments) for carrying out the invention.
<1.Description of the Principles>
[Fundamental Structure of an Electronic Apparatus]

Figure 1:
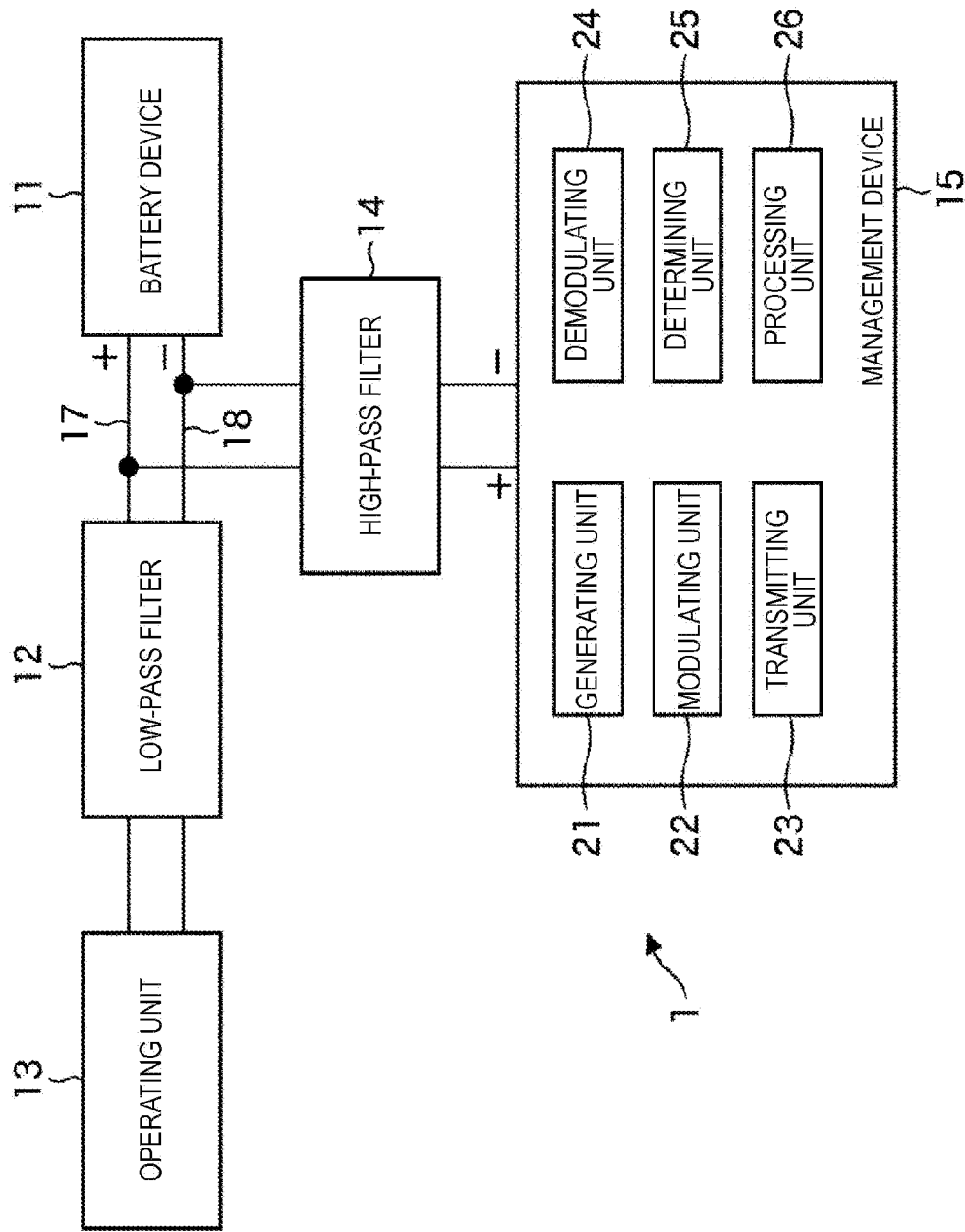
FIG. 1 is a block diagram showing a fundamental structure of an electronic apparatus to which the present invention is applied.

FIG. 1 shows a fundamental structure of an electronic apparatus that is an embodiment. This electronic apparatus 1 is formed with a battery device 11, a low-pass filter 12, an operating unit 13, a high-pass filter 14, and a management device 15.

The battery device 11 includes one or more battery cells (such as the battery cell 31-1 shown in FIG. 2) provided therein, and supplies DC voltage/DC current, or DC power, to the operating unit 13 via power lines 17 and 18. The operating unit 13 receives the supply of DC power from the battery device 11 via the low-pass filter 12, and performs various kinds of operations. For example, when the electronic apparatus 1 is regarded as an electric vehicle (EV), the operating unit 13 is equivalent to the motor that rotationally drives the tires. The battery device 11 can be formed as a battery pack, for example.

The low-pass filter 12 is placed on the power lines 17 and 18 between the battery device 11 and the operating unit 13, and can supply DC power to the operating unit 13 that is a block that operates with the DC power. The low-pass filter 12 blocks an AC signal that is generated by the management device 15 and is transmitted via the power lines 17 and 18, to prevent the AC signal from entering the operating unit 13 that operates with DC power and breaking the operating unit 13.

The high-pass filter 14 passes the AC signal generated by the management device 15 to the battery device 11 via the power lines 17 and 18. The high-pass filter 14 also blocks the DC power transmitted via the power lines 17 and 18, and prevents the DC power from breaking the management device 15 that operates with AC power.

The management device 15 manages the battery device 11 by communicating the AC signal to the battery device 11 via the power lines 17 and 18. The management device 15 includes the functional blocks of a generating unit 21, a modulating unit 22, a transmitting unit 23, a demodulating unit 24, a determining unit 25, and a processing unit 26.

The generating unit 21 generates a command for an IC chip 53 (FIG. 2) of the battery device 11. The modulating unit 22 modulates a carrier wave in accordance with the generated command, and outputs the modulated carrier wave as the AC signal. The carrier wave may be a high-frequency signal (also referred to as a RF signal) having a frequency f of 13.56 MHz, for example. The frequency f of the AC signal is not limited to 13.56 MHz, and any frequency may be used. The transmitting unit 23 outputs the AC signal to the power lines 17 and 18.

The demodulating unit 24 demodulates the reflected wave of the AC signal formed by subjecting the carrier wave to load modulation performed by the IC chip 53 of the battery device 11 based on reply information. The determining unit 25 performs various kinds of determining operations based on the demodulated reply information. The processing unit 26 performs various kinds of processing operations based on determination results.
<2. First Embodiment>[
First Example Structure Of A Battery Cell]

Figure 2:
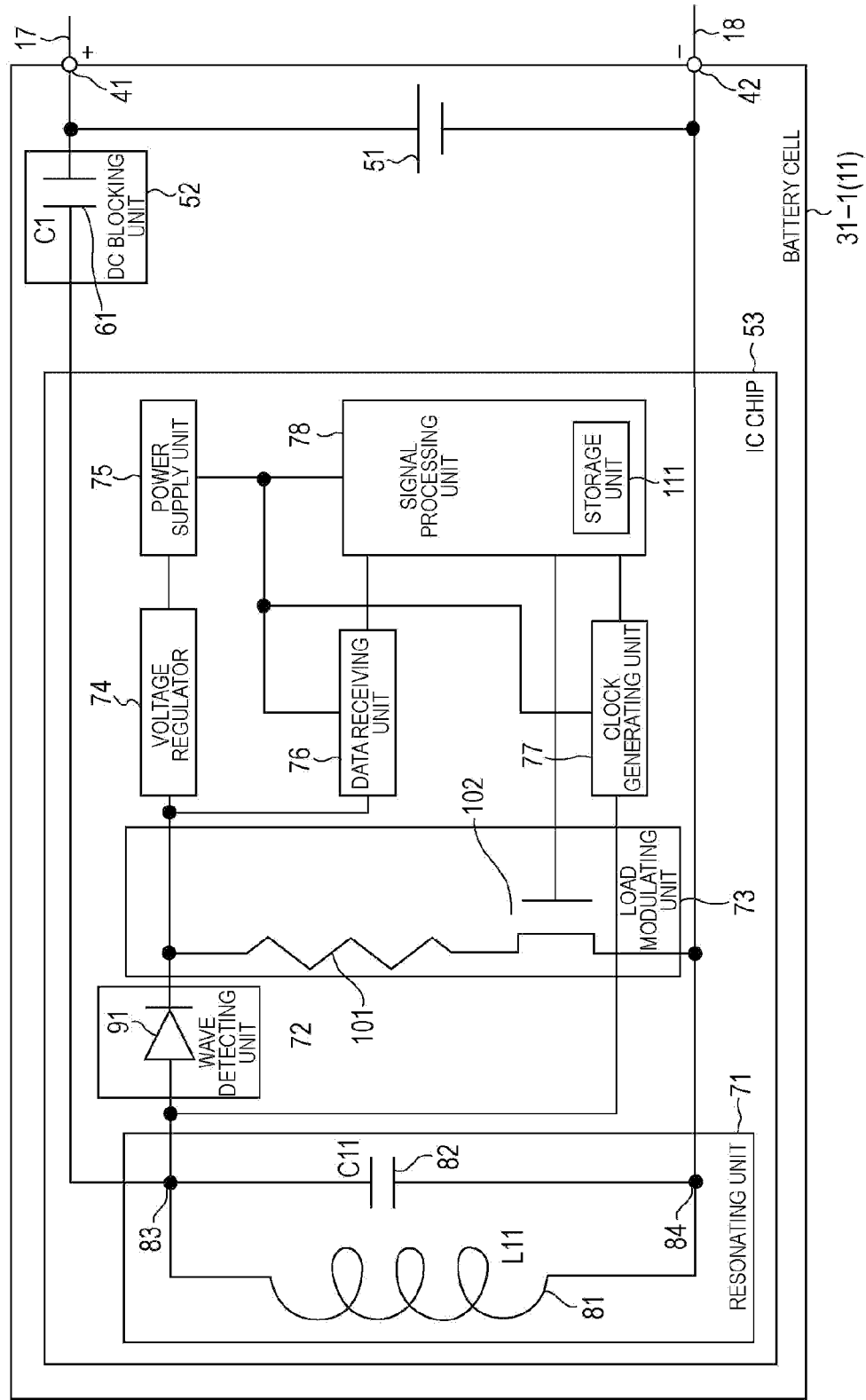
FIG. 2 is a block diagram showing a first example structure of a battery cell.

Next, an example structure of the battery device 11 is described. As described above, the battery device 11 is formed with one or more battery cells. FIG. 2 shows a first example structure of a battery cell of the battery device 11.

This battery cell 31-1 is formed with a battery 51, a DC blocking unit 52, and the IC chip 53.

The battery 51 outputs a positive voltage from a positive terminal 41 to the power line 17, and outputs a negative voltage from a negative terminal 42 to the power line 18. The battery 51 is a secondary battery that can be charged. That is, the power lines 17 and 18 serve as the passages for DC current/DC voltage at the time of charging or discharging.

The DC blocking unit 52 has the function to supply the AC signal supplied from the management device 15 via the power lines 17 and 18, to the IC chip 53. The DC blocking unit 52 also blocks DC power from entering the IC chip 53 through the power line 17. In this manner, the IC chip 53 is prevented from breaking down due to an input of DC power. The DC blocking unit 52 is formed with a capacitor 61 having a capacitance C1. The capacitor 61 is placed between the positive terminal 41 and the positive voltage supply point 83 of the IC chip 53.

The IC chip 53 as a storage element can be formed with an electronic tag, such as an IC chip or a tag compliant with various standards. For example, while an electronic tag compliant with standards such as RFID (Radio Frequency Identification), Mifare, FeliCa, and NFC (Near Field Communication) (all of which are registered trade names) can of course be used, an electronic tag that is not compliant with any of those standards and has a unique structure may also be prepared. The storage element preferably has the function to read and output at least the information stored therein with the AC signal, and further has the function to store supplied information. The storage element may be of either a passive type or an active type.

In the case illustrated in FIG. 2, the IC chip 53 is formed with a resonating unit 71, a wave detecting unit 72, a load modulating unit 73, a voltage regulator 74, a power supply unit 75, a data receiving unit 76, a clock generating unit 77, and a signal processing unit 78.

The resonating unit 71 is a parallel resonance circuit formed with a coil 81 having a self-inductance L11 and a capacitor 82 having a capacitance C11. One of the connecting points between the coil 81 and the capacitor 82 is the positive voltage supply point 83, and the other one of the connecting points is a negative voltage supply point 84. The values of the self-inductance L11 and the capacitance C11 are set so that the resonance frequency becomes 13.56 MHz. That is, the resonating unit 71 including the coil 81 functions as an antenna and also has the function to generate an AC inductive voltage through electromagnetic induction when the AC signal having the frequency f of 13.56 MHz is wirelessly communicated.

In this embodiment, however, the AC signal having the frequency f of 13.56 MHz is not wirelessly communicated, but is supplied from the management device 15 via a cable (the power lines 17 and 18). In view of this, the resonating unit 71 or at least the coil 81 may be eliminated. In this manner, false operations due to influence of nearby metal or the like can be prevented. In this case, the AC signal that is input via the power lines 17 and 18 is input directly to the wave detecting unit 72. Where the resonating unit 71 is not eliminated, the resonating unit 71 resonates with the AC signal having the frequency f of 13.56 MHz when the AC signal is input, and voltages are generated from the voltage supply points 83 and 84.

The wave detecting unit 72 is formed with a diode 91, for example. In this case, the anode of the diode 91 is connected to the positive voltage supply point 83, and the cathode is connected to one end of a resistor 101 of the load modulating unit 73. The diode 91 rectifies the AC inductive voltage from the positive voltage supply point 83 to a DC inductive voltage, and demodulates the signals contained in the AC signal (a carrier wave) transmitted from a reader/writer 291-11. One end of a FET (Field Effect Transistor) 102 that forms the load modulating unit 73 with the resistor 101 is connected to the other end of the resistor 101. The FET 102 as a switching element may be either a p-channel FET or an n-channel FET. It is also possible to use a bipolar transistor.

The voltage regulator 74 smoothes the voltage rectified by the diode 91, and turns the smoothed voltage into a constant voltage. The constant voltage is then supplied to the power supply unit 75. The power supply unit 75 distributes generated power to the data receiving unit 76, the clock generating unit 77, the signal processing unit 78, and the like.

The data receiving unit 76 extracts (or performs amplitude demodulation) and amplifies the low-frequency component from the half-wave rectified voltage that is output from the diode 91, generates a data signal that is binarized at the high level and the low level, and is then supplied to the signal processing unit 78. The clock generating unit 77 generates a rectangular clock signal from the AC signal supplied from the voltage supply point 83, and supplies the clock signal to the signal processing unit 78.

The signal processing unit 78 reads the data signal in synchronization with the clock signal. Based on battery information stored in a storage unit 111 provided inside, the signal processing unit 78 generates a response signal that is binarized at the high level and the low level, and outputs the response signal to the gate of the FET 102. The FET 102 is switched on or off in accordance with the response signal.

In this manner, load modulation to change the impedance seen from the voltage supply points 83 and 84 is performed. The battery information contains at least the identification information about the battery cell 31-1. The battery information can further contain specification information, history information, and billing information about the battery cell 31-1. Also, the IC chip 53 may have the function to detect the status (temperature, voltage, or the like) of the battery 51, and the battery information may further contain the detection result.

[Second Example Structure Of A Battery Cell]

Figure 3:
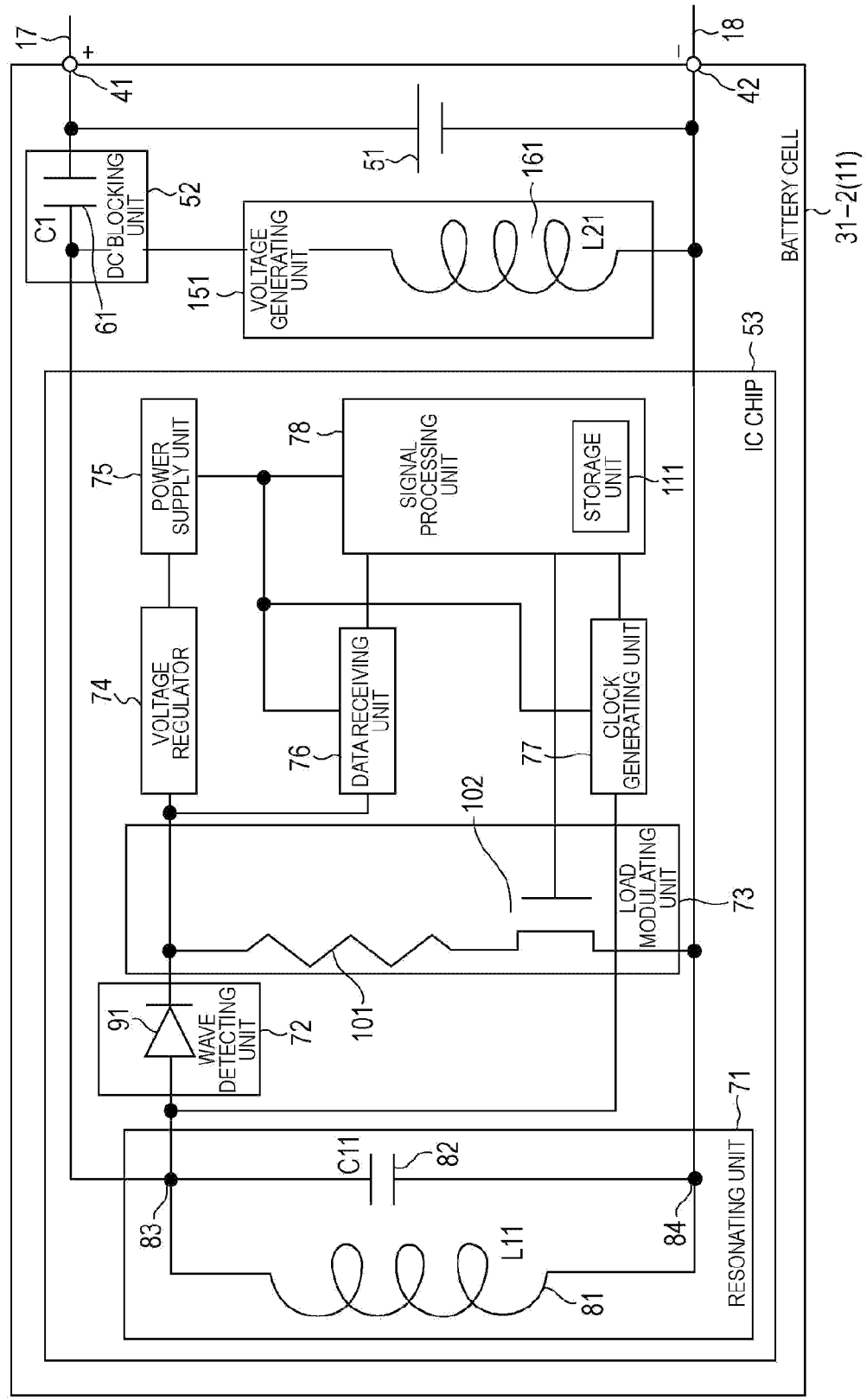
FIG. 3 is a block diagram showing a second example structure of a battery cell.

FIG. 3 shows a second example structure of a battery cell of the battery device 11. This battery cell 31-2 is the same as the first example structure shown in FIG. 2, except that a voltage generating unit 151 is added between the voltage supply points 83 and 84. The other components are the same as those of the first example structure, and therefore, explanation of them will not be repeated herein.

The voltage generating unit 151 is formed with a coil 161 having a self-inductance L21. The coil 161 generates voltage when the AC signal from the management device 15 is input via the power lines 17 and 18 and the capacitor 61. The generated voltage is supplied to the voltage supply points 83 and 84. The self-inductance L21 of the coil 161 and the capacitance C1 of the capacitor 61 satisfy the following equation (1) so that the coil 161 and the capacitor 61 form a series resonance circuit that resonates with the AC signal having the frequency f of 13.56 MHz.

$$2\pi f = 1/\sqrt{(L21 \cdot C1)} \tag{1}$$

In the case of the second example structure, voltage is generated at both the resonating unit 71 and the voltage generating unit 151. Accordingly, voltage can be generated with higher certainty than in the first example structure.

Therefore, in a case where the battery device 11 is formed with battery cells 31 connected in series, and the AC signal is communicated to each battery cell 31 via the power lines 17 and 18, the second example structure is more beneficial than the first example structure.

As described above, in the second example structure, the coil 161 and the capacitor 61 are designed to form a series resonance circuit for the AC signal at the frequency f. If the self-inductance L21 of the coil 161 is made higher, the voltage generating unit 151 can be made to generate a high voltage. Therefore, to increase the AC signal reading sensitivity of the IC chip 53, the self-inductance L21 is preferably made higher.

Where the self-inductance L21 is made higher or where the number of turns in the coil 161 is increased, however, the resistance in the coil 161 becomes higher, and the loss caused when the AC signal passes through the coil 161 becomes larger. This loss does not cause any problem in practice, as long as the battery device 11 is formed with one to several battery cells 31-2. In a case where the battery device 11 is formed with a large number of battery cells 31-2 connected in a cascade manner, however, the loss leads to a decrease in the AC signal reading sensitivity of the IC chip 53 of each battery cell 31-2, and therefore, some measures should be taken.

If the transmission power from the management device 15 is increased, the decrease in the AC signal reading sensitivity of the IC chip 53 can be reduced even though there is loss in the AC signal. Where the management device 15 frequently communicates with a large number of battery cells 31-2, however, the power consumption required for the communication becomes larger, and the power of the battery device 11 to be supplied to the operating unit 13 is wasted.

Therefore, there is a need for a mechanism for preventing loss in the AC signal while supplying a high voltage to the IC chip 53 without an increase in the transmission power for the AC signal.

[Third Example Structure Of A Battery Cell]

Figure 4:
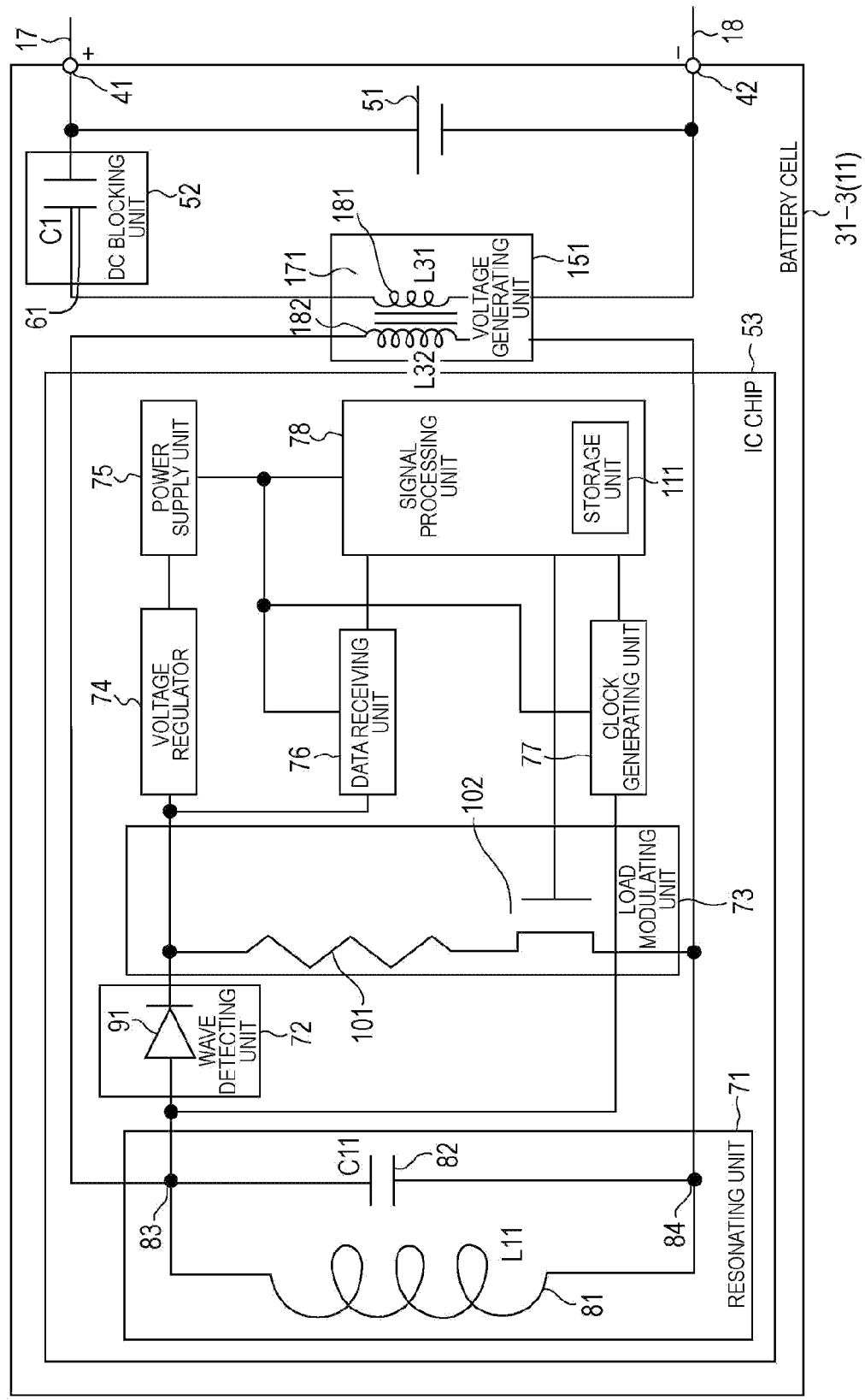
FIG. 4 is a block diagram showing a third example structure of a battery cell.

FIG. 4 shows a third example structure of a battery cell 31 having the above described mechanism. While the voltage generating unit 151 of the battery cell 31-2 as the second example structure is formed with the coil 161, this battery cell 31-3 has the voltage generating unit 151 formed with a transformer 171 having asymmetric numbers of coil turns. Except for the voltage generating unit 151, the battery cell 31-3 is the same as the battery cell 31-2 as the second example structure, and therefore, explanation of the other components is not repeated herein.

The transformer used as the transformer 171 is formed with a coil 181 (a self-inductance L31) on the side of the battery 51 and a coil 182 (a self-inductance L32) on the side of the IC chip 53. The number of turns in the coil 181 is smaller (the self-inductance L31 is lower), and the number of turns in the coil 182 is larger (the self-inductance L32 is higher than the self-inductance L31).

When an AC signal is input to the coil 181 of the transformer 171 via the capacitor 61, voltage is induced in the coil 182 electromagnetically-coupled to the coil 181, and the voltage is supplied to the voltage supply points 83 and 84.

In the battery cell 31-3, the number of turns in the coil 181 of the transformer 171 is small (the resistance is low), and loss in the AC signal can be reduced accordingly. Thus, an AC signal having only small loss can be transmitted to each battery cell 31-3 even in a case where battery cells 31-3 are connected in a cascade manner. As the number of turns in the coil 182 is large (the self-inductance L32 is high), a high voltage can be generated at the voltage generating unit 151, and be supplied to the IC chip 53.

In the transformer 171, the self-inductance L31 of the coil 181 on the side of the battery 51 and the self-inductance L32 of the coil 182 on the side of the IC chip 53 are determined in the following manner. However, the coil 81 that functions as an antenna when an AC signal having a frequency f of 13.56 MHz is wirelessly communicated can be eliminated as described above. Therefore, in the following, a method of forming a resonance circuit with the collective capacitance in the IC chip 53 including the capacitor 82 and the coil 182 without using the coil 81 is described.

Figure 5:
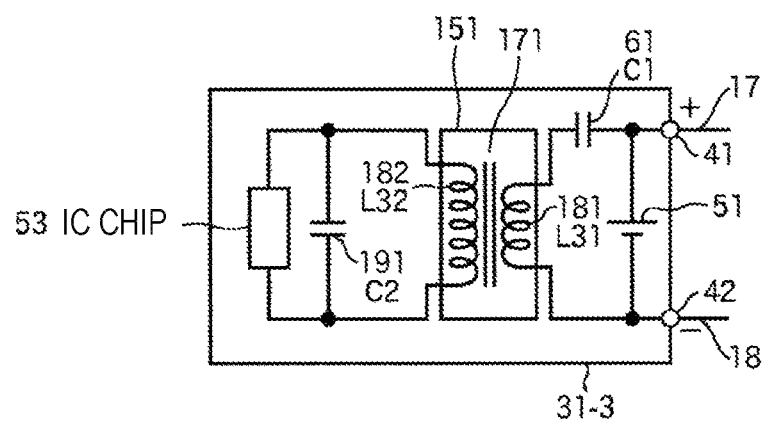
FIG. 5 is a simplified block diagram showing a third example structure of a battery cell.

FIG. 5 is a simplified diagram of the battery cell 31-3 shown in FIG. 4. A capacitor 191 (a capacitance C2) in parallel with the IC chip 53 is shown to indicate the collective capacitance in the IC chip 53 separately from the IC chip 53, for ease of explanation.

The self-inductance L31 of the coil 181 on the side of the battery 51 is determined to satisfy the following equation (2) so that the capacitor 61 (the capacitance C1) and the coil 181 form a series resonance circuit for the AC signal at the frequency f.

$$2\pi f = 1/\sqrt{(L31 \cdot C1)} \quad (2)$$

Meanwhile, the self-inductance L32 of the coil 182 on the side of the IC chip 53 is determined to satisfy the following equation (3) so that the capacitor 191 (the capacitance C2) and the coil 182 form a parallel resonance circuit for the AC signal at the frequency f.

$$2\pi f = 1/\sqrt{(L32 \cdot C2)} \quad (3)$$

The above described self-inductance L31 of the coil 181 and the above described self-inductance L32 of the coil 182 are ideal values, and such a transformer does not necessarily exist as a ready-made part. In such a case, a ready-made part having values close to the ideal values should be used.

With the above described battery cell 31-3 as the third example structure, loss in the AC signal can be prevented while a high voltage is supplied to the IC chip 53 without an increase in the transmission power for the AC signal. As a result, even if the number of battery cells 31-3 provided in the battery device 11 becomes larger, the battery information about each of the battery cells 31-3 can be prevented from failing to be processed.

<3. Second Embodiment>

[Structure of an Electronic Apparatus]

Next, an electronic apparatus that includes the above described battery device 11 is described.

Figure 6:
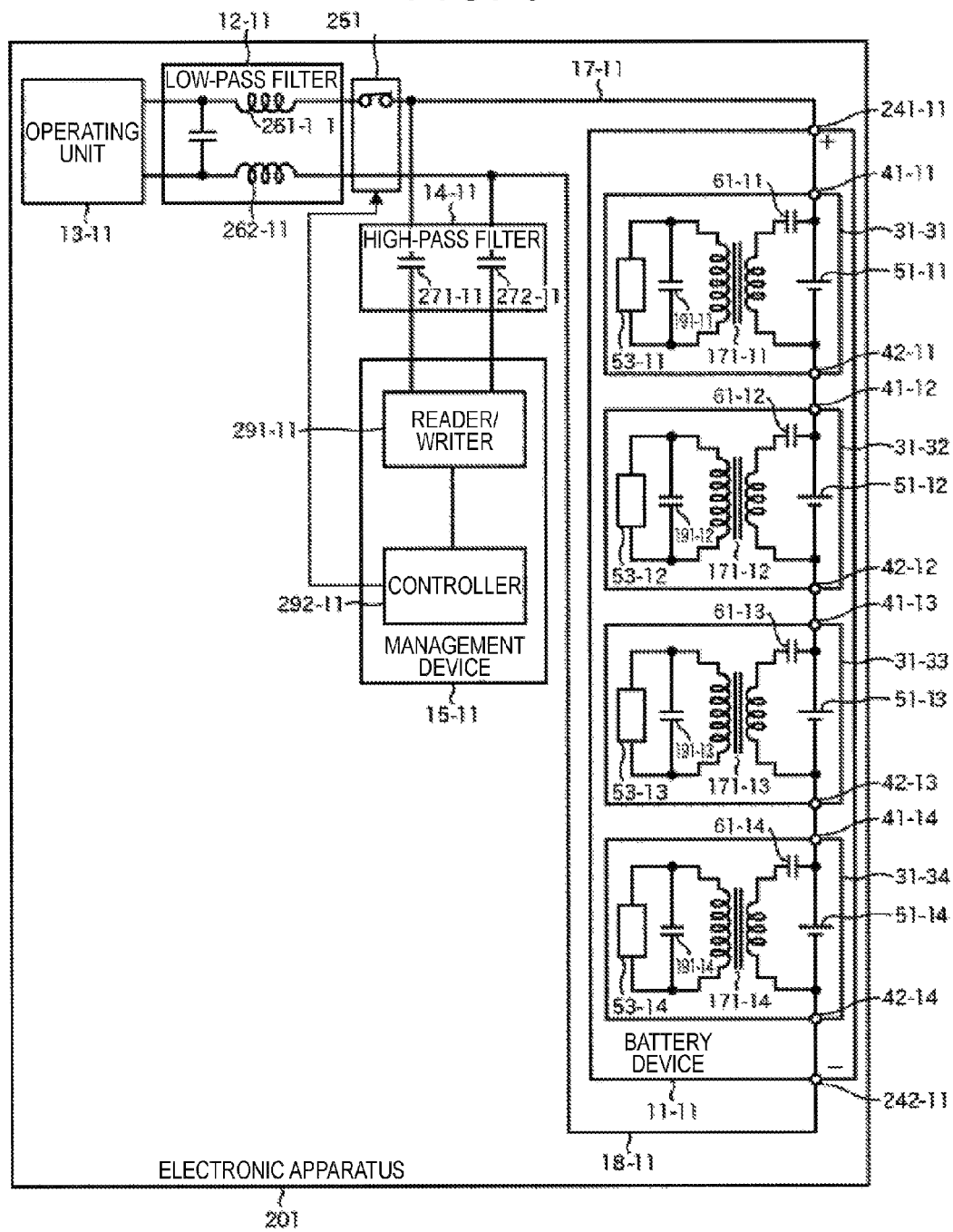
FIG. 6 is a block diagram showing an example structure of an electronic apparatus to which the present invention is applied.

FIG. 6 is a block diagram showing an example structure of the electronic apparatus that includes the battery device 11. This electronic apparatus 201 is an apparatus that operates on the power supplied from the battery device 11, and may be a personal computer, an electric vehicle, or the like.

The electronic apparatus 201 is formed with a battery device 11-11, a low-pass filter 12-11, an operating unit 13-11, a high-pass filter 14-11, a management device 15-11, and a switch 251.

The battery device 11-11 is formed with terminals 241-11 and 242-11, and a large number of battery cells 31-3. In the drawing, only four battery cells 31-31 through 31-34 connected in series are shown for convenience sake. The battery cells may be connected in parallel, or the number of the battery cells may be increased to achieve a higher capacity.

The terminals 241-11 and 242-11 are terminals through which discharging current flows (or charging current flows at the time of charging).

The battery cell 31-31 has the same structure as the third example structure of a battery cell 31 shown in FIG. 5. That is, the battery cell 31-31 includes a battery 51-11, a capacitor 61-11 as the DC blocking unit 52, a transformer 171-11 as the voltage generating unit 151, and an IC chip 53-11, and outputs DC power from terminals 41-11 and 42-11. The battery cell 31-31 further includes a capacitor 191191-11 (the capacitance C2) connected in parallel to the IC chip 53-11. It should be noted that the capacitor 191-11 is shown to indicate the collective capacitance in the IC chip 53-11 separately from the IC chip 53-11, for ease of explanation, as in FIG. 5.

The other battery cells 31-3$i$ (i=2, 3, and 4) each have the same structure as the battery cell 31-31.

The positive terminal 41-11 of the battery cell 31-31 is connected to the positive terminal 241-11 of the battery device 11-11, and the negative terminal 42-11 of the battery cell 31-31 is connected to the positive terminal 41-12 of the battery cell 31-32. Likewise, the positive terminal 41-13 of the battery cell 31-33 is connected to the negative terminal 42-12 of the battery cell 31-32, and the positive terminal 41-14 of the battery cell 31-34 is connected to the negative terminal 42-12 of the battery cell 31-33. The negative terminal 242-11 of the battery device 11-11 is connected to the negative terminal 42-14 of the battery cell 31-34.

The IC chips 53-11 through 53-14 of the battery cells 31-31 through 31-44 each store battery information containing the identification information thereof.

DC discharging current flows through the passage formed with a negative power line 18-11, the terminal 242-11, the terminal 42-14, the battery 51-14, the terminals 41-14 and 42-13, the battery 51-13, the terminals 41-13 and 42-12, the battery 51-12, the terminals 41-12 and 42-11, the battery 51-11, the terminals 41-11 and 241-11, and a positive power line 17-11.

The AC signal is input to the battery cell 31-31 via the positive power line 17-11 and the terminals 241-11 and 41-11. The AC signal at the frequency f that is input to the battery cell 31-31 flows into the transformer 171-11 via the capacitor 61-11, and the resonated AC signal is also input to the IC chip 53-11.

The AC signal that has passed through the battery cell 31-31 then flows through the battery cells 31-32, 31-43, and 31-44, and is output from the terminal 242-11. The AC signal of course flows through the above described passage in reverse order.

The low-pass filter 12-11 is formed with coils 261-11 and 262-11 inserted to the power lines 17-11 and 18-11, respectively, and a capacitor 263-11 connected between the power lines 17-11 and 18-11.

The high-pass filter 14-11 is formed with a capacitor 271-11 inserted to a positive line branching from the power line 17-11, and a capacitor 272-11 inserted to a negative line branching from the power line 18-11.

The management device 15-11 is formed with a reader/writer 291-11 and a controller 292-11. The reader/writer 291-11 communicates the AC signal at the frequency f to the battery cells 31-31 through 31-34, and the IC chips 53-11 through 53-14. The controller 292-11 controls the reader/writer 291-11 and the switch 251.

Specifically, the controller 292-11 performs authenticating operations on the battery cells 31-31 through 31-34 based on the battery information about the battery cells 31-31 through 31-34 acquired by the reader/writer 291-11, and turns on the switch 251 only after determining that the battery cells 31-31 through 31-34 are authentic. When the battery cells 31-31 through 31-34 are determined not to be authentic, on the other hand, the switch 251 is turned off.

With the above described electronic apparatus 201, the AC signal reading sensitivity of each IC chip 53 can be increased, without an increase in the transmission power of the management device 15 for the AC signal. The power from the battery device 11-11 is supplied to the operating unit 13-11 only when the battery cells 31-31 through 31-34 are authentic.

In the above described first and second embodiments, (the battery cells 31 of) the battery devices 11 are authenticated. However, the present invention can be applied not only to authentication of the battery devices 11 but also to authentication of electronic apparatuses that do not include an internal battery and are driven with AC power.

<4. Third Embodiment>
[Structures of an Electronic Apparatus and a Table Tap]

Figure 7:
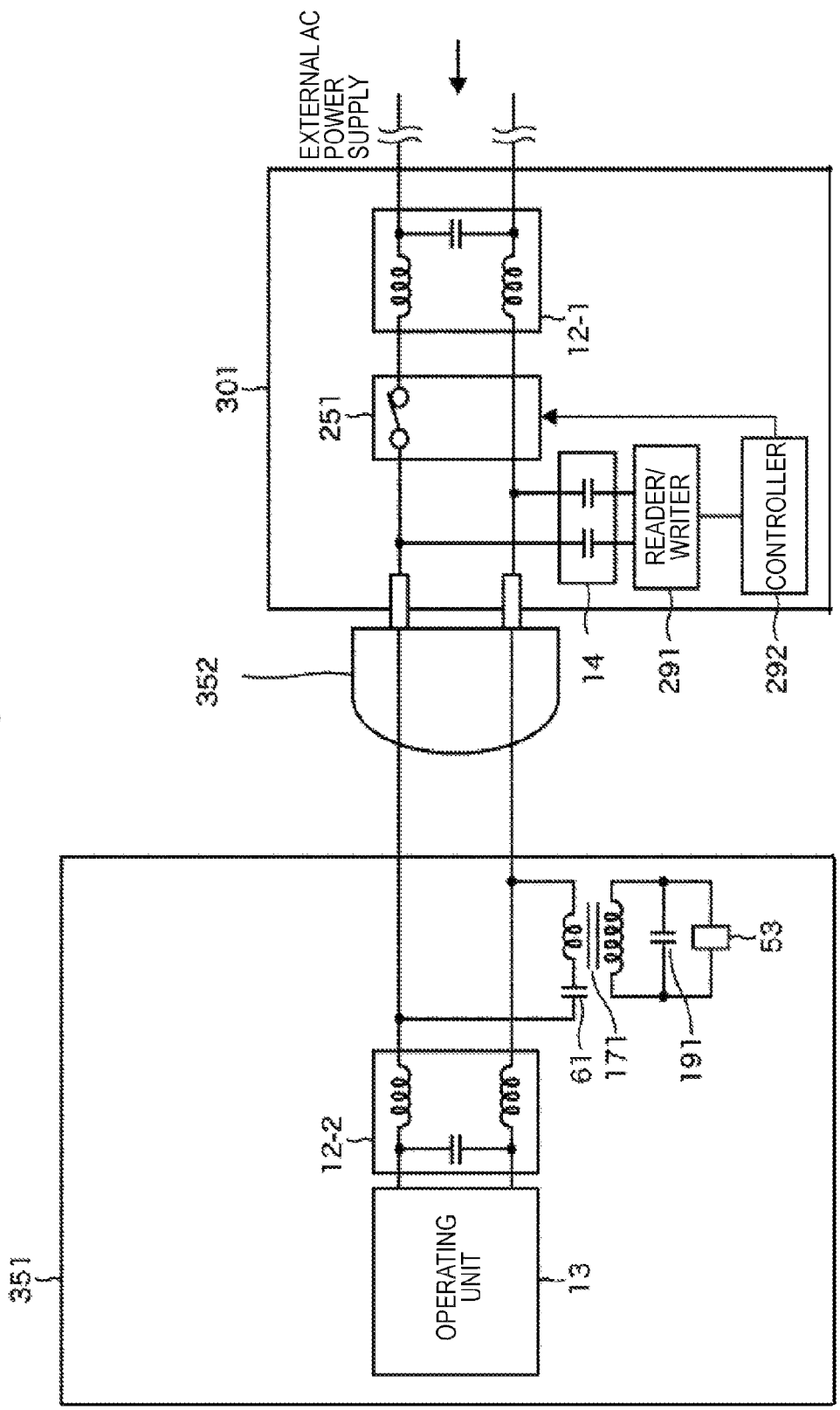
FIG. 7 is a block diagram showing example structures of an electronic apparatus and a table tap to which the present invention is applied.

FIG. 7 shows, as a third embodiment, example structures of an electronic apparatus that is driven with AC power and a table tap that supplies the AC power.

This table tap 301 includes a low-pass filter 12-1, a high-pass filter 14, a switch 251, a reader/writer 291, and a controller 292. This electronic apparatus 351 includes a low-pass filter 12-2, an operating unit 13, a capacitor 61, an IC chip 53, a transformer 171, a capacitor 191, and a plug 352. Those components are denoted by the same reference numerals as the corresponding components of the electronic apparatus 201 shown in FIG. 6, and therefore, explanation of them is not repeated herein.

In the third embodiment illustrated in FIG. 7, authentication of the electronic apparatus 351 is performed when the plug 352 of the electronic apparatus 351 is inserted to the table tap 301. The third embodiment may be utilized by installing the table tap 301 in shops, hotels, and other public places, so that AC power is supplied only to authenticated electronic apparatuses 351, and the users of the electronic apparatuses are charged in accordance with the amounts of the supplied power.

It should be noted that embodiments of the present invention are not limited to the above described embodiments, and various modifications may be made to them without departing from the scope of the invention.

REFERENCE SIGNS LIST

1 Electronic apparatus
11 Battery device
12 Low-pass filter
13 Operating unit
14 High-pass filter
31 Battery cell
51 Battery
52 DC blocking unit
53 IC chip
151 Voltage generating unit
171 Transformer
181, 182 Coils
201 Electronic apparatus
251 Switch
301 Table tap
351 Electronic apparatus

The invention claimed is:

1. A communication device comprising:
a storage element configured to output stored information via a power line by performing load modulation on an AC signal transmitted or received via the power line;

a voltage generating unit configured to supply voltage generated from the AC signal transmitted or received via the power line to the storage element, the voltage generating unit being connected in parallel to the storage element and including a transformer having a first coil on a side of the storage element and a second coil on a side of the power line, a self-inductance L1 of the first coil being higher than a self-inductance L2 of the second coil; and an input blocking unit, connected in series with the second coil, configured to block power flowing through the power line from being input to the storage element, wherein a battery is connected in parallel with the series connection of the input blocking unit and the second coil, the battery configured to output DC power via the power line.

2. The communication device according to claim 1, further comprising a first capacitor configured to form a series resonance circuit for frequency of the AC signal with the second coil.

3. The communication device according to claim 2, wherein the first capacitor serves as the input blocking unit.

4. The communication device according to claim 1, further comprising a second capacitor configured to form a parallel resonance circuit for frequency of the AC signal with the first coil.

5. The communication device according to claim 4, wherein the second capacitor is provided in the storage element.

6. A communication method for a communication device including a storage element, a voltage generating unit that is connected in parallel to the storage element and includes a transformer having a first coil on a side of the storage element and a second coil on a side of a power line, a self-inductance L1 of the first coil being higher than a self-inductance L2 of the second coil, an input blocking unit and a battery, the communication method comprising:

outputting stored information via the power line by performing load modulation on an AC signal transmitted or received via the power line, the outputting being performed by the storage element;

supplying voltage generated from the AC signal transmitted or received via the power line to the storage element, the supplying being performed by the voltage generating unit; and blocking, by the input blocking unit, power flowing through the power line from being input to the storage element, wherein the input blocking unit is connected in series with the second coil, and wherein the battery is connected in parallel with the series connection of the input blocking unit and the second coil, the battery configured to output DC power via the power line.

7. A battery device comprising:
a battery configured to output DC power via a power line;

a storage element configured to output stored battery information via the power line by performing load modulation on an AC signal transmitted or received via the power line;

a voltage generating unit configured to supply voltage generated from the AC signal transmitted or received via the power line to the storage element, the voltage generating unit being connected in parallel to the storage element and including a transformer having a first coil on a side of the storage element and a second coil on a side of the power line, a self-inductance L1 of the first coil being higher than a self-inductance L2 of the second coil; and an input blocking unit, connected in series with the second coil, configured to block power flowing through the power line from being input to the storage element, wherein the battery is connected in parallel with the series connection of the input blocking unit and the second coil.

8. The battery device according to claim 7, which is formed with a plurality of battery cells each including the battery, the storage element, and the voltage generating unit, the battery cells being connected in series.

9. An electronic apparatus comprising:
a battery device including:
a battery configured to output DC power via a power line;

a storage element configured to output stored battery information via the power line by performing load modulation on an AC signal transmitted or received via the power line;

a voltage generating unit configured to supply voltage generated from the AC signal transmitted or received via the power line to the storage element, the voltage generating unit being connected in parallel to the storage element and including a transformer having a first coil on a side of the storage element and a second coil on a side of the power line, a self-inductance L1 of the first coil being higher than a self-inductance L2 of the second coil; and an input blocking unit, connected in series with the second coil, configured to block power flowing through the power line from being input to the storage element, wherein the battery is connected in parallel with the series connection of the input blocking unit and the second coil;

an operating unit configured to perform a predetermined operation by using the power supplied from the battery device; and a management device configured to acquire the battery information by communicating the AC signal to the storage element via the power line, and control the power supply from the battery device to the operating unit based on the acquired battery information.

* * * * *